(12) United States Patent
Obersteiner

(10) Patent No.: US 6,634,580 B2
(45) Date of Patent: Oct. 21, 2003

(54) KITCHEN APPLIANCE HAVING A TOOL DRIVE MEANS WHICH CAN BE BRAKED AND IS ROTATABLY SUPPORTED IN A CONTAINER

(75) Inventor: Heimo Obersteiner, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 40 days.

(21) Appl. No.: 09/976,343

(22) Filed: Oct. 12, 2001

(65) Prior Publication Data

US 2002/0074195 A1 Jun. 20, 2002

(51) Int. Cl.$^7$ .......................... A47J 43/044; B02C 25/00
(52) U.S. Cl. ................. 241/37.5; 241/199.12; 241/282.1
(58) Field of Search ..................... 173/2, 213; 241/37.5, 241/282.1, 282.2, 155.12; 366/314

(56) References Cited

U.S. PATENT DOCUMENTS 4,285,473 A * 8/1981 Williams .................... 241/37.5

FOREIGN PATENT DOCUMENTS

| FR | 2725384 | 12/1996 |
| WO | WO9858579 | 12/1998 |
| WO | WO0167937 | 9/2001 |

* cited by examiner

Primary Examiner—Mark Rosenbaum
(74) Attorney, Agent, or Firm—Ernestine C. Bartlett

(57) ABSTRACT

In a kitchen appliance (1) having firstly a container (3) and having secondly a cover (11) for the container (3) and having thirdly a tool drive means (10) which is accommodated in the container (3) and which is rotatably supported in the container (3) with the aid of bearing means (9, 21) which allow a pivotal movement, which tool drive means is passed through an opening (15) in the cover (11) and is disposed in the opening (15) so as to be clear of the cover (11) in order to allow a pivotal movement of the tool drive means (10), and having fourthly a drive arrangement (28) placed on the cover (11) coupled to the tool drive means (10) so as to be in driving engagement therewith, the tool drive means (10) is, in the fifth place, provided with a brake means (30), whose braking function is disabled when the drive arrangement (28) is coupled to the tool drive means (10) and which in response to a disengagement of the drive arrangement (28) from the tool drive means (10) performs its braking function as a result of a pivotal movement of the tool drive means (10).

6 Claims, 1 Drawing Sheet

KITCHEN APPLIANCE HAVING A TOOL DRIVE MEANS WHICH CAN BE BRAKED AND IS ROTATABLY SUPPORTED IN A CONTAINER

The invention relates to a kitchen appliance having a container and a cover for the container and a tool drive means in the container and a drive arrangement disposed on the cover, for driving the tool drive means, means being provided with the aid of which the tool drive means can be braked after the drive arrangement has been switched off and the cover has been removed from the container.

Such a kitchen appliance of the type defined in the first paragraph has been put onto the market by the applicant under the type designation HR2831 and is consequently known. In connection with this known kitchen appliance reference can also be made to the patent document WO 98/58579 A1. During normal operation, while the substance to be processed is present in the container, the tool drive means of the known kitchen appliance is braked mainly and very rapidly by the processed substance present in the container. In the case of an unusual mode of operation of the known kitchen appliance, when the container is empty and the kitchen appliance is yet put into operation, i.e. while the drive arrangement is operative, after an electric motor forming part of the drive arrangement has been switched off the tool drive means is braked mainly by the electric motor and by the drive mechanism to be driven by this motor, which is caused by the bearing friction in the motor, by the brush friction in the motor and by the friction in the drive mechanism provided between the motor and the tool drive means. In the case of normal use of the known kitchen appliance in an unusual mode, i.e. when the container is empty, the turned-off electric motor also ensures a sufficiently effective and rapid braking of the tool drive means and, consequently, of the tool coupled to the tool drive means. However, in the case of an unusual mode of operation of the kitchen appliance when the kitchen appliance is not used in accordance with the instruction manual, when during operation the cover is impermissibly removed from the container after or already while the drive arrangement and, consequently, the electric motor is switched off, the tool drive means and, as a result, the tool coupled thereto will coast so long that there is a risk that the person using the kitchen appliance reaches into the container and is injured by the coasting tool, which is formed by, for example, a cutter.

It is an object of the invention to preclude the potential risk described herembefore and to realize an improved kitchen appliance which complies with the most stringent safety regulations, for example the safety regulations in accordance with IEC-60335-2-14, which safety regulations stipulate that cutters of compact kitchen appliances should coast to standstill within 1.5 seconds after opening or removal of the cover.

In order to achieve the afore-mentioned object characteristic features in accordance with the invention have been provided in a kitchen appliance in accordance with the invention, so that a kitchen appliance in accordance with the invention can be characterized in the manner defined hereinafter, namely:

A kitchen appliance having a container, which is disposed on a work surface during operation of the kitchen appliances and which serves to hold a substance to be processed and which has a bottom wall and a circumferential wall having a container rim. The appliance includes a tool unit which is supported on a bearing protruding from the bottom wall, a cover, which is placed on the container in the area of the container rim and which has an opening for the passage of a portion of the tool unit and which is removable from the container, and, a drive, unit which is mounted on the cover and coupled to the tool unit during operation of the kitchen appliance and thereby positions the tool unit in a driving position. The drive unit is removable from the cover and disengageable from the tool unit. The portion of the tool unit which passes through the lid opening has clearance sufficient to permit tilting of the tool unit when the drive unit is removed, and tool unit has a lower end which includes a bearing arrangement which engages the bearing which protrudes from the container bottom. The bearing arrangement also allows pivotal movement of the tool drive means about the protruding bearing means of the container. The lower end of the tool unit also includes a brake element which protrudes downward and is spaced radially outward and remote from the bearing arrangement, and has clearance from the container bottom wall when the tool unit is not tilted. The braking function is therefore disabled when the tool unit is coupled to the drive unit and is thus positioned in its driving position. The brake means produces a braking action by engaging the bottom wall of the container as a result of the pivotal movement of the tool unit when the tool unit is disengaged from the drive unit and thus allows the tool unit to perform a pivotal movement.

As a result of the provision of the measures in accordance with the invention it is achieved in a constructionally simple and very cheap yet highly reliable manner that the tool unit in the container is braked particularly effectively and therefore rapidly, as a result of which after switching off and after removal of the cover from the container the tool unit can now keep on running only for such a short time that it is substantially impossible for a user to come into contact with a tool which is coupled to the drive unit and is still in motion, because the time required for access to drive unit and the tool in the container is longer than the run-out time.

It has proved to be very advantageous when the brake is arranged to protrude axially from the lower end region of the tool unit because in this case the brake can exert braking action in the area of the bottom wall regardless of whether the cover is removed or is not removed from the container.

The brake may take the form of, for example, a brake block which enters into operational engagement with the bottom wall of the container as a result of a pivotal movement of the tool drive means. However, it has proved to be particularly advantageous when the brake is formed by a an annular brake ring because this guarantees a braking performance which is independent of a given locally bounded position.

It has also proved to be very advantageous when the brake ring consists of an elastomer, because such a brake ring provides a particularly good braking performance. However, it is alternatively possible to use other materials, for example synthetic materials having a high coefficient of friction.

The aforementioned aspects as well as further aspects of the invention will be apparent from the example of an embodiment described hereinafter and will be elucidated with the aid of this example.

The invention will be described in more detail hereinafter with reference to an embodiment which is shown in the drawings by way of example but to which the invention is not limited.

Figure 1:
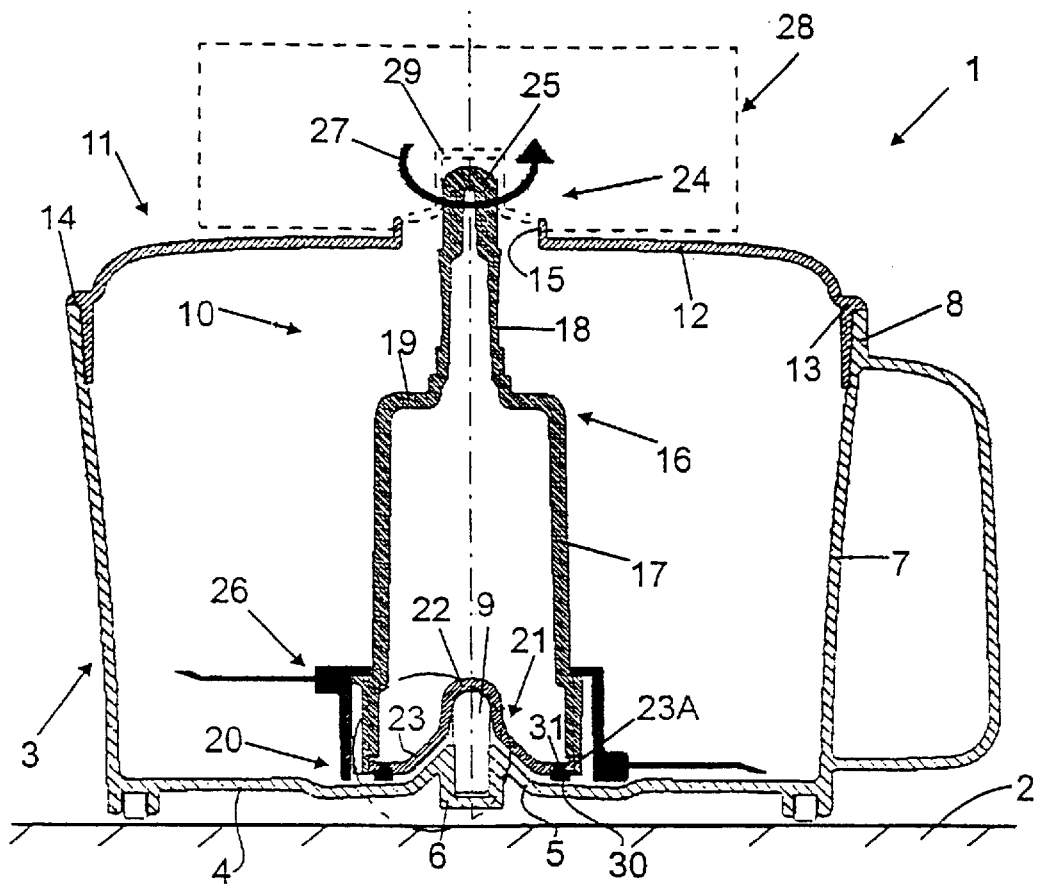
FIG. 1 is a partly very diagrammatic sectional view of a kitchen appliance embodying the invention.

FIG. 1 shows a kitchen appliance 1 placed on a work surface 2. The kitchen appliance 1 has a container 3, which is disposed on the work surface 2 during operation of the kitchen appliance 1 and which serves to and is adapted to hold a substance to be processed. The container 3 has a bottom wall 4 having a frustoconical wall portion 5 in its central area, which portion changes into a sleeve-shaped wall portion 6. In its peripheral area the bottom wall 4 is connected to a circumferential container wall 7, which at its side which is remote from the bottom wall 2 terminates in a container rim 8. In the area of its bottom wall 4 the container 3 has a steel bearing pin 9. The bearing pin 9 engages in the sleeve-shaped wall portion 6, in which it is positively locked against rotation. Locking against rotation can alternatively or additionally be achieved by ultrasonic welding or with the aid of an adhesive joint. The bearing pin 9 has a rounded free end and serves as a bearing means for supporting a tool drive means 10 so as to be rotatable with respect to its axis 10A, which tool drive means 10 will be described in greater detail hereinafter.

The kitchen appliance 1 further has a cover 11. The cover 11 consists of an upper wall 12, to which upper wall 12 a circumferential cover wall 12 is connected in its peripheral area, which last-mentioned wall has a stepped portion, so as to form an annular seating surface 14 in the area of the circumferential cover wall 13. The cover 12 is placed onto the container 3 in the area of the container rim 8, the annular seating surface 14 being supported on the free end surface of the container rim 8. In the central area of the upper wall 12 the cover 11 has an opening 15 for the passage of a part of the tool drive means 10. The cover 11 can be removed from the container 3 by hand.

The kitchen appliance 1 further includes the tool drive means 10 already mentioned. The tool drive means 10 consists of a hollow and essentially turret-like supporting member 16 made up of a first turret portion 17 of comparatively large diameter and a second turret portion 18, whose diameter is smaller than the comparatively large diameter of the first turret portion, the two turret portions 17 and 18 being interconnected by a shoulder portion 19.

In a first end zone 20, which faces the bottom wall 4 of the container 3, the tool drive means 10 has a bearing means 21 for the cooperation with the bearing pin 9 of the container 3. The bearing means 21 has a bearing cap 22, which changes into a flared central bearing rim 23 having an angular portion 23A at its free end portion, which angular portion is fixedly connected to that end of the first turret portion 17 which faces the bottom wall 4 of the container 3. The bearing cap 22 has a shape which slightly widens toward the central bearing rim 23, as a result of which the bearing means 21 of the tool drive means 10 is clear of the bearing pin 9 of the container 2 and thus, under given conditions, allows the bearing means 21 and, consequently, the tool drive means 10 to perform a limited pivotal movement about the bearing pin 9.

In the second end zone 24, which is remote from the first end zone 20, the tool drive means 10 has a coupling portion 25, which projects from the second turret portion 18 and which is of square cross-section. The tool drive means 10 extends through the opening 15 in the cover 12 with its coupling portion 25.

The tool drive means 10 is accommodated in the container 3 and can be removed from the container 3 after removal of the cover 11 from the container 3. The tool drive means 10 serves to and is adapted to hold and drive different tools. FIG. 1 shows such a tool in the form of a cutter 26, which is locked in rotation to the tool drive means 10 in a manner not shown, as a result of which the cutter 26 can be set into rotation, as indicated by the arrow 27, with the aid of the tool drive means 10.

For driving the tool drive means 10 and, as a consequence, the cutter 26 the kitchen appliance 1 has a drive arrangement 28, which is shown only diagrammatically as a block in FIG. 1. This is because the construction of the drive arrangement 28 is not relevant in the present context. The drive arrangement 28 may, for example, have the same construction as in the known kitchen appliance mentioned in the introduction.

During operation of the kitchen appliance 1 the drive arrangement 28 is placed on the cover 11 and is thus coupled to the tool drive means 10, i.e. to coupling portion 25 of the tool drive means 10, via a coupling portion 29 which is of square inner cross-section and which is shown in broken lines. Instead of the square cross-sectional shapes it is alternatively possible to use other cross-sectional shapes suitable for realizing a rotationally locked and disengageable positive coupling. With the aid of the coupling portion 29 of the drive arrangement 28 and its coupling portion 25 the tool drive means 10 is positioned in a driving position in which the tool drive means 10 extends nominally perpendicularly to the bottom wall 4 of the container 3. The drive arrangement 28 can be removed from the cover 4 and is thus disengageable from the tool drive means 10.

In the kitchen appliance 1 the coupling portion 25 of the tool drive means 10, which portion is situated in the second end zone 24, is advantageously disposed in the opening 15 of the cover 11 so as to be clear of the cover 11. The clearance between the cover wall 12 and the coupling portion 25 is dimensioned so as to allow a pivotal movement of the tool drive means 10 about the bearing pin 9 when there is no coupling between the coupling portion 25 and the drive arrangement 28, i.e. when the drive arrangement 28 has been removed from the cover 11.

Figure 2:
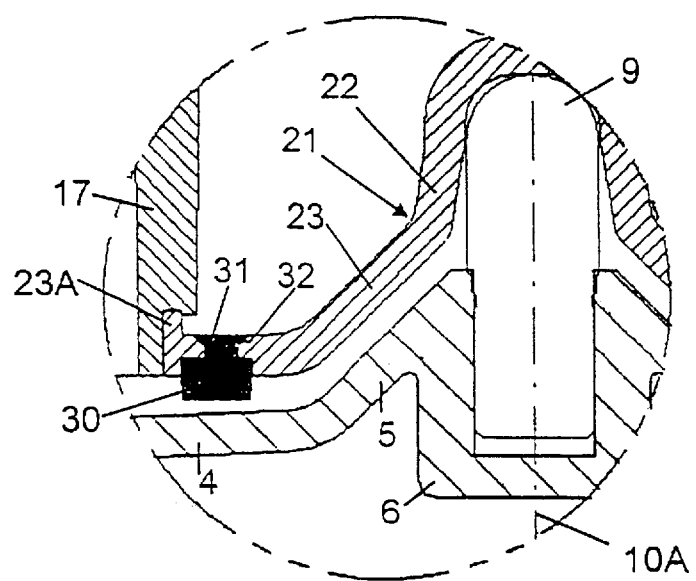
FIG. 2 is a sectional view which shows a relevant part of the kitchen appliance shown in FIG. 1.

Furthermore, the construction chosen for the kitchen appliance 1 is such that the tool drive means 10 is equipped with a brake means 30. The brake means 30 is now arranged in the first end zone 20 of the tool drive means 10, which end zone faces the bottom wall 4 of the container 3, and is formed by a brake ring made of rubber and connected to the tool drive means 10. As is apparent particularly from FIG. 2, the brake ring provided as the brake means 30 is connected to the bearing cap 22 in the end zone of the central bearing rim 23, namely in such a manner that the brake ring provided as the brake means 30 has projections 31 at given distances, each of these projections 31 being disposed in a funnel-shaped passage 32 in the central bearing rim 23. The braking function of the brake ring provided as the brake means 30 is disabled when the drive arrangement 28 is coupled to the tool drive means 10, which is because in this operational situation the tool drive means 10 is positioned, i.e. centered, exactly in the direction of the axis 10A with the aid of the drive arrangement 28, i.e. with the aid of the coupling portion 29 of the drive arrangement 28. Conversely, when the tool drive means 10 is disengaged from the drive arrangement 28 and, consequently, is allowed to perform a pivotal movement, the construction of the kitchen appliance 1 being such that the brake ring 30 provided as the brake means 30 produces a braking action by cooperation with the container 3, i.e. with the bottom wall 4 of the container 3, caused by the pivotal movement of the tool drive means 10.

In the kitchen appliance 1 the brake ring forming the brake means 30 provides a very rapid and effective braking action when the drive arrangement 28 is removed from the cover 11.

It is to be noted that the disengagement of the drive arrangement 28 from the tool drive means 10 need not necessarily be effected by removal of the drive arrangement 28 from the cover 11 of the kitchen appliance 1. In a modified construction the coupling portion 29 in the drive arrangement 28 is mechanically disengaged from the coupling portion 25 of the tool drive means 10 with the aid of disengagement means provided for this purpose, when the drive arrangement 28 is switched off, so that also in this case the tool drive means 10 is allowed to perform a pivotal movement and, consequently, also in this case an efficient and rapid braking of the tool drive means 10 with the aid of the brake means 30 is guaranteed. With such a construction it is also possible in a further constructional modification that the brake means 30 connected to the tool drive means 10 is arranged in the area of the upper wall 12 of the cover 11.

What is claimed is:

1. A kitchen appliance (1) comprising a container (3), which is disposed on a work surface (2) during operation of the kitchen appliance (1) and which serves to hold a substance to be processed, said container having a bottom wall (4) and a circumferential wall (7) having a container rim (8), and bearing means (9) protruding upward from the bottom wall for rotatably supporting a tool drive means (10), a cover (11), which is placed on the container (3) in the area of the container rim (8) and which has an opening (15) for the passage of a portion (25) of the tool drive means (10) and which is removable from the container (3), and a drive arrangement (28), which is mounted on the cover (11) during operation of the kitchen appliance (1) and is coupled to the tool drive means (10) and thereby positions the tool drive means (10) in a driving position and which is removable from the cover (11) and disengageable from the tool drive means (10), in which the tool drive means (10), which is accommodated in the container (3), has a first end zone (20) facing the bottom wall (4) of the container (3), and a second end zone (24) remote from the first end zone (20) and passed through the opening (15) in the cover (11), the first end zone including bearing means (21) for cooperation with the bearing means (9) of the container (3), and the second end zone including a portion (25) of said tool drive means arranged for operable engagement with the drive arrangement 28, and in which the portion (25) of the tool drive means (10), which portion is disposed in the second end zone (24), is disposed in the opening (15) of the cover (11) so as to be clear of the cover (11), and in which a portion of the bearing means (21) of the tool drive means (10) has a clearance from the bearing means (9) of the container (3) so as to allow essentially a pivotal movement of the tool drive means (10) about the bearing means (9) of the container (3) when the drive arrangement (28) is not mounted on the cover (11) and is not coupled to the tool drive means, characterized in that the tool drive means (10) comprises brake means (30) disposed radially outwardly with respect to and remote from the bearing means (21), the braking function of the brake means (30) being disabled and free from contact with the bottom wall (4) when the tool drive means (10) is coupled to the drive arrangement (28) and is thus positioned in its driving position, and the brake means (30) being arranged and adapted to produce a braking action by engaging said bottom wall as a result of the pivotal movement of the tool drive means (10) when the tool drive means (10) is disengaged from the drive arrangement (28) and thus allows the tool drive means (10) to perform a pivotal movement.

2. A kitchen appliance (1) as claimed in claim 1, in which the brake means (30) is an axially protruding portion of the first end zone (20) of the tool drive means (10).

3. A kitchen appliance (1) as claimed in claim 2, in which the brake means consists of an elastomer.

4. A kitchen appliance (1) as claimed in claim 2, in which the brake means is formed by a brake block.

5. A kitchen appliance (1) as claimed in claim 2, in which the brake means (30) is formed by an annular brake ring.

6. A kitchen appliance (1) as claimed in claim 5, in which the brake ring consists of an elastomer.

* * * * *